United States Patent
Slinger

(10) Patent No.: US 7,923,677 B2
(45) Date of Patent: Apr. 12, 2011

(54) CODED APERTURE IMAGER COMPRISING A CODED DIFFRACTIVE MASK

(75) Inventor: Christopher William Slinger, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 12/278,521

(22) PCT Filed: Feb. 6, 2007

(86) PCT No.: PCT/GB2007/000411
§ 371 (c)(1),
(2), (4) Date: Aug. 6, 2008

(87) PCT Pub. No.: WO2007/091051
PCT Pub. Date: Aug. 16, 2007

(65) Prior Publication Data
US 2009/0020714 A1    Jan. 22, 2009

(30) Foreign Application Priority Data

Feb. 6, 2006 (GB) .................................. 0602380.8

(51) Int. Cl.
*H01J 3/14* (2006.01)
*H01L 27/00* (2006.01)
*G01T 1/161* (2006.01)
(52) U.S. Cl. .................. 250/216; 250/208.1; 250/363.06
(58) Field of Classification Search ............... 250/208.1, 250/237 G, 216, 363.06
See application file for complete search history.

(56) References Cited

U.S. PATENT DOCUMENTS 3,860,821 A    1/1975  Barrett
3,961,191 A    6/1976  Stoner et al.
(Continued)

FOREIGN PATENT DOCUMENTS

DE    25 28 641 A1    1/1976
(Continued)

OTHER PUBLICATIONS

Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748, (XP 000533631).

(Continued)

*Primary Examiner* — Thanh X Luu
(74) *Attorney, Agent, or Firm* — Oliff & Berridge, PLC

(57) ABSTRACT

The present invention relates to an imaging system which employs the same principles as coded aperture imaging. High angular resolution coded aperture imagers require a small aperture size and relatively large spacing between the coded aperture array and the detector. At such high resolutions diffraction effects can start to dominate and can degrade image quality. The present invention provides a detector array which receives radiation from a scene via a coded diffractive mask. The coded diffractive mask is designed such that its diffraction pattern at the waveband of interest is a well conditioned coded intensity pattern having a strong autocorrelation function with low sidelobes. Thus radiation reaching the detector array is diffracted by the diffractive mask but in a defined way and it is the diffraction pattern of the mask which provides the coding. The scene image can then be reconstructed using the same techniques as for conventional coded aperture imaging but using the diffraction pattern of the mask as the aperture function. The coded diffractive mask may be a binary or greyscale mask, may operate in reflection or transmission and may be an amplitude or phase modulating mask.

10 Claims, 3 Drawing Sheets

U.S. PATENT DOCUMENTS

| | | | |
|---|---|---|---|
| 4,075,483 A | 2/1978 | Tancrell et al. |
| 4,092,540 A | 5/1978 | Barrett |
| 4,165,462 A | 8/1979 | Macovski et al. |
| 4,209,780 A | 6/1980 | Fenimore et al. |
| 4,954,789 A | 9/1990 | Sampsell |
| 5,047,822 A | 9/1991 | Little, Jr. et al. |
| 5,115,335 A | 5/1992 | Soref |
| 5,294,971 A | 3/1994 | Braunecker et al. |
| 5,311,360 A | 5/1994 | Bloom et al. |
| 5,426,312 A | 6/1995 | Whitehead |
| 5,448,395 A | 9/1995 | Lopez et al. |
| 5,488,504 A | 1/1996 | Worchesky et al. |
| 5,500,761 A | 3/1996 | Goossen et al. |
| 5,519,529 A | 5/1996 | Ahearn et al. |
| 5,552,912 A | 9/1996 | Sharp et al. |
| 5,579,149 A | 11/1996 | Moret et al. |
| 5,636,001 A | 6/1997 | Collier |
| 5,636,052 A | 6/1997 | Arney et al. |
| 5,710,656 A | 1/1998 | Goossen |
| 5,772,598 A | 6/1998 | Halling |
| 5,784,189 A | 7/1998 | Bozler et al. |
| 5,825,528 A | 10/1998 | Goossen |
| 5,838,484 A | 11/1998 | Goossen |
| 5,841,579 A | 11/1998 | Bloom et al. |
| 5,870,221 A | 2/1999 | Goossen |
| 5,943,155 A | 8/1999 | Goossen |
| 5,949,571 A | 9/1999 | Goossen et al. |
| 5,953,161 A | 9/1999 | Troxell et al. |
| 5,995,251 A | 11/1999 | Hesselink et al. |
| 6,034,807 A | 3/2000 | Little et al. |
| 6,069,361 A | 5/2000 | Rubinstein |
| 6,195,412 B1 | 2/2001 | Tobin, Jr. et al. |
| 6,324,192 B1 | 11/2001 | Tayebati |
| 6,329,967 B1 | 12/2001 | Little et al. |
| 6,392,235 B1 | 5/2002 | Barrett et al. |
| 6,396,976 B1 | 5/2002 | Little et al. |
| 6,424,450 B1 | 7/2002 | Goossen |
| 6,430,333 B1 | 8/2002 | Little et al. |
| 6,467,879 B1 | 10/2002 | Kubby et al. |
| 6,519,073 B1 | 2/2003 | Goossen |
| 6,570,143 B1* | 5/2003 | Neil et al. ............... 250/201.9 |
| 6,737,652 B2 | 5/2004 | Lanza et al. |
| 6,819,463 B2 | 11/2004 | Noonan |
| 6,819,466 B2 | 11/2004 | Tayebati |
| 6,856,449 B2 | 2/2005 | Winkler et al. |
| 7,006,132 B2 | 2/2006 | Pereira et al. |
| 7,031,577 B2 | 4/2006 | Painters et al. |
| 7,235,773 B1 | 6/2007 | Newman |
| 7,251,396 B2 | 7/2007 | Larochelle et al. |
| 7,415,049 B2 | 8/2008 | Flanders et al. |
| 2002/0075990 A1 | 6/2002 | Lanza et al. |
| 2003/0058520 A1 | 3/2003 | Yu et al. |
| 2003/0122955 A1 | 7/2003 | Neidrich |
| 2003/0164814 A1 | 9/2003 | Starkweather et al. |
| 2003/0191394 A1 | 10/2003 | Simon et al. |
| 2004/0008397 A1 | 1/2004 | Noonan |
| 2004/0046123 A1 | 3/2004 | Dausch |
| 2005/0057793 A1 | 3/2005 | Starkweather et al. |
| 2005/0248827 A1 | 11/2005 | Starkweather et al. |
| 2006/0038705 A1 | 2/2006 | Brady et al. |
| 2006/0157640 A1 | 7/2006 | Perlman et al. |
| 2007/0013999 A1* | 1/2007 | Marks et al. ............... 359/368 |
| 2007/0091051 A1 | 4/2007 | Shen |
| 2008/0128615 A1 | 6/2008 | Lamadie et al. |
| 2008/0151391 A1 | 6/2008 | Zalevsky et al. |
| 2008/0259354 A1 | 10/2008 | Gharib et al. |
| 2008/0285034 A1 | 11/2008 | Gharib et al. |
| 2009/0008565 A1 | 1/2009 | Gottesman |
| 2009/0020714 A1 | 1/2009 | Slinger |
| 2009/0022410 A1 | 1/2009 | Haskell |
| 2009/0090868 A1 | 4/2009 | Payne |
| 2009/0167922 A1* | 7/2009 | Perlman et al. ............. 348/340 |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2314664 | 1/1998 |
| GB | 2 350 472 | 11/2000 |
| GB | 2 414 881 A | 12/2005 |
| GB | 2 418 028 A | 3/2006 |
| GB | 2 434 935 A | 8/2007 |
| JP | A-55-146411 | 11/1980 |
| JP | A-04-005620 | 1/1992 |
| JP | A-09-113819 | 5/1997 |
| JP | A-2003-4441 | 1/2003 |
| WO | WO 91/12502 A1 | 8/1991 |
| WO | WO 94/18582 A1 | 8/1994 |
| WO | WO 96/24032 A1 | 8/1996 |
| WO | WO 97/26557 | 7/1997 |
| WO | WO 98/46007 A1 | 10/1998 |
| WO | WO 00/17810 | 3/2000 |
| WO | WO 00/45608 A1 | 9/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 A1 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).

Busboom et al., "Coded aperture imaging with multiple measurements," *J. Opt. Soc. Am. A*, May 1997, pp. 1058-1065, vol. 14, No. 5, Optical Society of America, (XP 002431989).

Graziani et al., "Localization of GRBs by Bayesian Analysis of Data from the HETE WXM," AIP Conference Proceedings AIP USA, 2003, No. 662, (XP 002467862).

Graziani et al., "Determination of X-Ray Transient Source Positions by Bayesian Analysis of Coded Aperture Data," Oct. 8, 1997, pp. 1-6, (XP 002467863).

Gopinathan et al., "Coded apertures for efficient pyroelectric motion tracking," *Optics Express*, Sep. 8, 2003, vol. 11, No. 18, pp. 2142-2152, (XP 002467864).

Goossen et al., "Silicon Modulator Based on Mechanically-Active Anti-Reflection Layer with 1 Mbit/sec Capability for Fiber-in-the-loop Applications," *IEEE: Photonics Technology Letters*, Sep. 1994, pp. 1119-1121, vol. 6, No. 9, IEEE, (XP 000468079).

Accorsi et al., "High-Sensitivity Dynamic Coded Aperture Imaging," *2003 IEEE Nuclear Science Symposium Conference Record*, vol. 5 of 5, Oct. 19, 2003, pp. 1833-1837, vol. 13, IEEE.

Brown, "Multiplex imaging with multiple-pinhole cameras," *Journal of Applied Physics.*, Apr. 1974, pp. 1806-1811, vol. 45, No. 4, American Institute of Physics Monnelly et al., "HETE Soft X-ray Camera Imaging: Calibration, Performance, and Sensitivity," *AIP Conference Proc.*, 2003, pp. 49-55, American Institute of Physics.

Fish et al., "Scanning singular-value-decomposition method for restoration of images with space-variant blur," *J. Opt. Soc. Am. A*, Mar. 1996, pp. 464-469, vol. 13, No. 3, Optical Society of America.

Lewis et al., "Micromachined Modulator Arrays for Use in Free-Space Optical Communication Systems," *Advanced Free-Space Optical Communications Techniques and Technologies, Proc. of. SPIE*, vol. 5614, pp. 24-30, 2004.

Moseley et al., "Microshutters Arrays for the JWST Near Infrared Spectrograph," *Proceedings SPIE, International Society for Optical Engineering*, 2004, vol. 5487, Part 2, pp. 645-652.

Kutyrev et al., "Programmable Microshutter Arrays for the JWST NIRSpec: Optical Performance," *IEEE Journal of Selected Topics in Quantum Electronics*. May/Jun. 2004, vol. 10, No. 3, pp. 652-661.

De Villiers et al.; "Positive solutions to linear inverse problems," *Inverse Problems*, 1999, pp. 615-635, vol. 15, IOP Publishing Ltd.

U.S. Appl. No. 60/726,655, filed Oct. 17, 2005 in the name of David Brady.

U.S. Appl. No. 12/278,528, filed Aug. 6, 2008 in the name of Douglas Payne.

U.S. Appl. No. 12/278,515, filed Aug. 6, 2008 in the name of Philip Haskell.

U.S. Appl. No. 12/278,470, filed Aug. 6, 2008 in the name of Christopher Slinger.

U.S. Appl. No. 12/278,500, filed Aug. 6, 2008 in the name of Mark McNie et al.

U.S. Appl. No. 12/278,524, filed Aug. 6, 2008 in the name of Christopher Slinger et al.

U.S. Appl. No. 12/373,946, filed Jan. 15, 2009 in the name of Malcolm Strens.

Fenimore et al.; "Coded aperture imaging with uniformly redundant arrays"; *Applied Optics*; Feb. 1, 1978; pp. 337-347; vol. 17, No. 3; Optical Society of America.

Cannon et al.; "Tomographical imaging using uniformly redundant arrays"; *Applied Optics*; Apr. 1, 1979; pp. 1052-1057; vol. 18, No. 7; Optical Society of America.

Casasent et al.; "Real-time deformation invariant optical pattern recognition using coordinate transformations"; *Applied Optics*; Mar. 1, 1987; pp. 938-942; vol. 26, No. 5; Optical Society of America.

Mertz et al.; "Fresnel Transformations of Images"; *Proceedings of the Conference on Optical Instruments and Techniques*; London 1961; Ed. K.J. Habel; 1961; pp. 305-312.

Wood et al.; "Hybrid optics in dual waveband infrared systems"; *Proc. SPIE*; 1998; pp. 602-613; vol. 3482.

Tam et al.; "Spatial-light-modulator-based electro-optical imaging system"; *Applied Optics*; Feb. 10, 1992; pp. 578-580; vol. 31, No. 5; Optical Society of America.

Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.

International Search Report for PCT/GB2006/001890 mailed Aug. 28, 2006.

GB Search Reports for Application No. 0510470.8 dated Aug. 16, 2005, Nov. 8, 2005 and Nov. 10, 2005.

Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.

Aug. 26, 2009 Office Action issued in U.S. Appl. No. 12/278,528.

U.S. Appl. No. 60/792,335, filed Oct. 17, 2005 in the name of David Brady.

Bertero et al., "Image Restoration Methods for the Large Binocular Telescope (LBT)," Astronomy and Astrophysics, May 30, 2000, pp. 1-15.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electooptical System (ADDIOS) Application to Coded Aperture Imaging and Non-Imaging Sensor Systems," Proc. of SPIE, 2007, vol. 6714, pp. 671406-1 to 671406-12, (XP-002558346).

Mohan et al., "Sensing Increased Image Resolution Using Aperture Masks," CVPR, 2008, pp. 1-8, (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).

Rocchia et al., "A Multiplex Imaging Spectrometer for Low Energy X-Ray Astronomy," Astrophysics and Space Science, Oct. 1983, vol. 96, No. 2, pp. 361-374.

Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.

Dec. 23, 2009 International Search Report issued in corresponding International Application No. PCT/GB2009/001870.

Mar. 5, 2010 International Search Report issued in corresponding International Application No. PCT/GB2009/002780.

Mar. 19, 2009 Office Action issued in corresponding Application No. GB0822281.2.

Mar. 29, 2010 Office Action issued in U.S. Appl. No. 12/278,470.

May 7, 2010 Office Action issued in U.S. Appl. No. 11/920,345.

Feb. 23, 2010 Office Action issued in U.S. Appl. 12/278,528.

Nov. 18, 2009 Office Action issued in U.S. Appl. No. 11/920,345.

Aug. 31, 2010 Office Action issued in U.S. Appl. No. 12/278,528.

Sep. 30, 2010 Office Action issued in U.S. Appl. No. 12/278,470.

Oct. 19, 2010 Office Action issued in U.S. Appl. No. 12/278,500.

Sep. 14, 2010 Office Action issued in Japanese Patent Application No. 2008-512909 (translation).

\* cited by examiner

Preprocessed imagery data

10 FPGA / Modular ASIC / ASIC

To machine (automated surveillance, detection, identification, tracking etc.)

To display(s) and human(s)

Figure 2
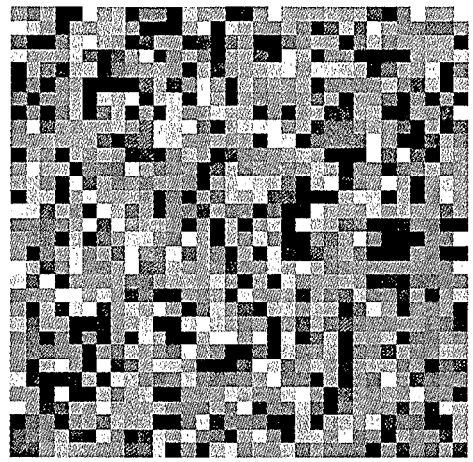
Fig 2a
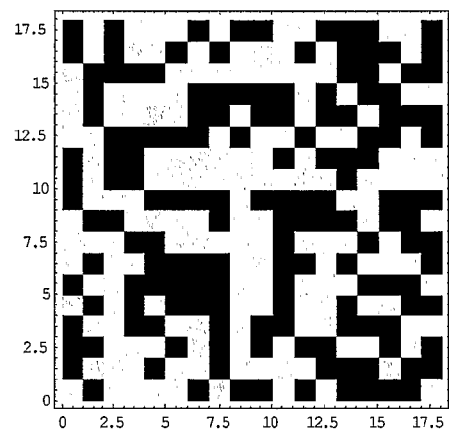
Fig 2b
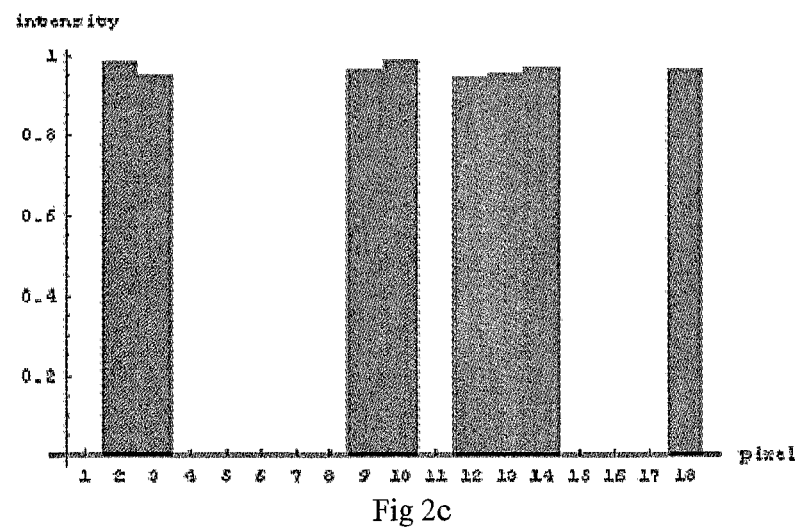
Fig 2c

4(a)

4(b)

CODED APERTURE IMAGER COMPRISING A CODED DIFFRACTIVE MASK

This invention relates to a coded imaging system, especially to a coded imaging system employing diffraction patterns.

Optical systems for observing scenes are employed in a wide range of situations from CCTV security systems to surveillance/reconnaissance systems. Often these systems are required to be such that the imaging performance of the system can be adjusted, for example, in terms of resolution or image update rate. Another example is where there is a requirement for the imager to be scanned over a large field-of-regard (FOR) the FOR being many times larger than the instantaneous field-of-view (FOV).

Mechanical scanning of optical systems is well known, for instance movement of a lens or a mirror arrangement can change the FOV in the FOR or the whole imaging system may be moved. However movement of optical components requires generally bulky and heavy mechanical moving means and in some applications minimising size and weight are important. Further mechanically scanned systems can generate unwanted vibrations which can distort the acquired image. Also rapid movement of large and heavy optical components or the whole system, which can have a large moment of inertia, can be problematic.

It is also known to a use a spatial light modulator (SLM) to display a diffractive pattern so as to achieve scanning, see for example published PCT application WO2000/17810. Different diffractive patterns can be displayed which focus radiation from different parts of the scene to a detector. Thus scanning is achieved without any moving parts which can reduce the weight and bulk of the optical system but such diffractive lens approaches are often inefficient too.

Recently, see our co-pending U.S. patent application Ser. No. 11/920,345, the present inventors have proposed using a reconfigurable coded aperture imager having a reconfigurable coded aperture mask means.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon T M, Fenimore E E, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution but increasing the number of apertures increases the radiation arriving at the detector thus increasing the signal to noise ratio. Each aperture passes an image of the scene to the detector array and so the pattern at the detector array is an overlapping series of images and is not recognisable as the scene. Processing is needed to reconstruct the original scene image from the recorded data.

The reconstruction process requires knowledge of the aperture array used and system configuration and the aperture array chosen is often coded to allow subsequent good quality image reconstruction. The processing is performed using a mathematical model of the particular array at a set location.

Coded aperture imaging can be thought of as a geometric imaging technique and for the applications it is usually used for, e.g. astronomy, diffraction is negligible.

The use of a reconfigurable coded aperture mask means allows different coded aperture masks to be displayed at different times. This allows, for example, the direction and FOV of the imaging system to be altered without requiring any moving parts. Further the resolution of the imaging system can also be altered by changing the coded aperture mask displayed on the coded aperture mask means.

The pattern displayed on the coded aperture mask means is a coded aperture mask and at least part of the coded aperture mask is a coded aperture array. That is either the whole pattern displayed on the mask means is a coded aperture array or only part of the pattern is a coded aperture array. For the avoidance of doubt the term aperture used herein does not imply a physical hole in the mask means but merely an area of the pattern which allows radiation to reach the detector.

As mentioned the reconfigurable mask means can display a variety of coded aperture masks having a variety of coded aperture arrays in different positions on the mask means. The field of view of the imaging system can be altered by changing the position of the coded aperture mask on the array relative to the detector and the resolution can be altered by changing the size of the coded aperture array. Knowledge of the particular array displayed and its location is used in reconstructing the scene image in the same way as for a fixed coded aperture.

U.S. patent application Ser. No. 11/920,345 teaches a versatile and lightweight imaging system that can be rapidly configured to have different fields of view or resolution without any moving parts. It eliminates the need for conventional optics, gives conformal imaging capability, can have an infinite depth of field and gives inherent power free encryption since decoding of the image requires knowledge of the coded aperture array used. The imaging apparatus described therein is particularly suitably for several imaging and surveillance applications in the visible, infrared or ultraviolet wavebands.

However, high resolution imaging requires small aperture sizes and a longer optical path from the detector to the mask, which increases the effects of diffraction. Diffraction causes a blurring of the pattern formed by the mask on the detector array, reducing the coding and making decoding a good quality image difficult. In the extreme, the pattern at the detector array may be so blurred that no image can be reconstructed.

It is therefore an object of the invention to provide a coded imaging system which mitigates the above mentioned disadvantage and which operates predominantly in a diffractive rather than a geometric (shadow casting) mode.

Thus according to the present invention there is provided a coded imager comprising a detector array arranged to receive, in use, radiation from a scene through a coded diffractive mask.

A coded diffractive mask is a mask which has a pattern that causes diffraction of incident radiation of the waveband of interest and produces a diffraction pattern on the detector array that is a well conditioned coded pattern, i.e. the diffraction pattern formed at the detector array has a sharp autocorrelation function with small sidelobes when the system is imaging a single point from the scene.

Thus the present invention is similar to conventional coded aperture imaging in that it produces a coded pattern which can be decoded to reconstruct the scene image.

However, unlike conventional coded aperture imaging where the mask pattern is designed to be well conditioned and ensure that there is minimal diffraction and any diffraction effects from the mask are compensated for in processing, the present invention deliberately uses a mask pattern which causes diffraction but ensures that the diffracted pattern is itself well conditioned. The present invention therefore employs diffraction as part of the imaging process rather than trying to suppress diffraction as has been previously taught, and allows coded aperture imagers to operate at higher angular resolutions than may have been considered to be possible recently.

In a traditional coded aperture imager the angular resolution of the imaging system is dictated by the mask to detector spacing along the optical axis and the larger of the feature size of the coded aperture mask and the elements of the detector array. A high resolution coded aperture imager requires a small aperture size and relatively large mask to detector spacing. With small apertures diffraction becomes significant and coupled with a relatively large mask to detector spacing diffraction effects can destroy the coded information at the detector array. Reducing the effects of diffraction requires use of larger coded apertures or smaller mask to detector spacing, with a corresponding reduction in angular resolution.

The present invention uses diffraction and designs the coded diffraction pattern such that the pattern at the detector array is well conditioned. Thus the present invention exploits the diffraction present and preserves the information in the signal. Also, this means that it is the feature size of the diffracted pattern on the detector array which determines the angular resolution. This is not necessarily directly related to the feature size of the coded diffractive mask (as is the case for standard coded aperture imaging) and hence the present invention allows a certain amount of greater design freedom.

It should be noted that the present disclosure is quite different from the approach of using diffractive lenses such as described in WO2000/17810. Imagers using diffractive lenses replace a conventional lens with a diffractive element which has the same functionality. Thus these systems teach diffractive lenses which focus radiation to form an image at the detector plane. The coded diffractive mask of the present disclosure does not focus radiation and does not produce an image in the detector plane. A point source imaged by an imager having a diffractive lens would produce a point on the detector array. The present disclosure is arranged to image the same point would produce a coded intensity pattern on the detector array (or a significant part of it) which was well conditioned—this intensity pattern would need to be decoded to reconstruct the image.

Given that the diffractive mask generates a well conditioned pattern at the detector array simple decoding algorithms can be used based on the diffraction pattern is in a manner analogous to conventional coded aperture imaging. More advanced decoding techniques may be used to improve resolution. The apparatus may therefore also comprise a processor for applying a decoding algorithm to the intensity pattern on the detector array so as to reconstruct a scene image.

The diffractive mask may take any of a number of forms. The diffractive mask could be a binary amplitude mask, for instance an array of apertures akin to conventional coded aperture imaging systems or other binary diffraction pattern. However as the principles of diffraction are being exploited other mask technologies are available. For instance analogue or greyscale masks could be used, i.e. masks which have non-binary degrees of modulation. Phase modulating masks could also be used, either binary phase modulating masks or analogue phase modulating masks. Use of a phase modulating mask means that a higher proportion of the radiation incident on the array can be passed to the detector array with the appropriate phase modulation and therefore the collection efficiency of an imager using a coded diffractive phase modulating mask can be greater than one using a amplitude modulating mask. The mask may work in transmission or reflection. A variety of techniques related to design of diffractive elements can also be used, such as techniques applicable to design of computer generated holograms, see for example "Iterative approaches to computer-generated holography", Jennison, Brian K.; Allebach, Jan P.; Sweeney, Donald W., Optical Engineering (ISSN 0091-3286), vol. 28, June 1989, p. 629-637. Also multi-order diffraction techniques might be exploited to braded the bandwidth of the system, see, for example, Wood A P, Rogers P J "Hybrid optics in dual waveband infrared system", Proc. SPIE 3482, p. 602-618 (1998).

The coded diffractive mask may be a fixed mask, i.e. have a fixed pattern, or may be provided by a reconfigurable coded diffractive mask means. As mentioned above U.S. patent application Ser. No. 11/920,345 teaches the advantages of using a reconfigurable mask means in order to provide different coded aperture masks having, for instance, different fields of view and/or different resolutions. The coded diffractive mask could similarly be reconfigurable. The position and size of the coded diffractive mask on the mask means defines the field of view of the system and the diffracted feature size in part dictates the resolution of the imager.

The skilled person would be well aware of a number of different technologies that could comprise the reconfigurable mask means, for instance liquid crystal devices, micro-optic electro-mechanical system (MOEMS) modulator arrays, micro-mirror devices and so on could be used as reconfigurable amplitude or phase modulating mask means.

A variety of codings may be used for the coded diffractive mask. The coded diffractive mask is similar to a computer generated hologram (CGH) and a number of CGH design techniques are known that would enable design of a coded diffractive mask pattern which would project a desired diffraction pattern onto the detector array.

It will be appreciated that diffraction effects vary with wavelength and therefore operation with a broad wavelength range can reduce contrast, unless care is taken in the design of the mask and other parameters of the coded aperture system. For some applications the incident radiation will only have a narrow wavelength range and dispersion effects are of reduced significance. In general the coded diffractive mask pattern is designed for the wavelength range of interest.

The apparatus may therefore comprise a relatively narrow wavelength detector array operating at the wavelength range of interest. In which case the coded diffractive mask is obviously designed to give a well conditioned pattern within this waveband of operation. Additionally or alternatively the apparatus may comprise at least one filter means so as to define a waveband of operation and again the mask used will be appropriate for that waveband.

The apparatus could be arranged to take a series of images of the scene at different wavelengths, each image being acquired with a coded diffractive mask appropriate for that wavelength. A broadband detector array could be used with a succession of filters, for example a filter wheel or a tuneable filter. Preferably the passband of the filter means is therefore adapted to be changed periodically, either in a constant succession or controllably in response to a control signal. The apparatus may be adapted to provide a different coded diffractive mask for a different passband of the filter means. Thus the imager of the present invention could be usefully employed in a hyperspectral or multispectral imager where images are acquired at a plurality of wavelengths or wavebands. As mentioned in the case the coded diffractive pattern used which each waveband could be designed to produce a well conditioned pattern for that waveband. The design of the coded diffractive masks can impose other constrains, for instance they ensure that a polychromatic point source in the scene would project exactly the same pattern in each appropriate waveband or they could be designed to give different patterns at different wavelengths.

It is noted that careful mask and system design can result in masks which have relatively large wavelength ranges over which they produce a well conditioned pattern at the detector array.

The present disclosure therefore provides a method of coded imaging wherein diffraction is deliberately used. Thus in another aspect of the disclosure there is provided a method of imaging comprising the steps of arranging a detector array to receive radiation from a scene via a mask means, wherein the mask means comprises a coded diffractive mask that generates a well conditioned diffraction pattern onto the detector array.

The method of the present invention enjoys all of the same advantages and embodiments as described above with respect to the first aspect of the invention.

In particular the method preferably further involves decoding the intensity pattern on the detector array to reconstruct an image of the scene. The method may also involve the step of periodically reconfiguring the coded diffractive mask so as to provide at least one of a different field of view and a different resolution. The method may also comprise reconfiguring the coded diffractive mask to provide a mask optimised for a different wavelength of incident radiation.

The present invention will now be described by way of example only with respect to the following drawings of which;

FIG. 2 illustrates a simulated phase modulating mask and the pattern formed on the detector array.

Figure 1:
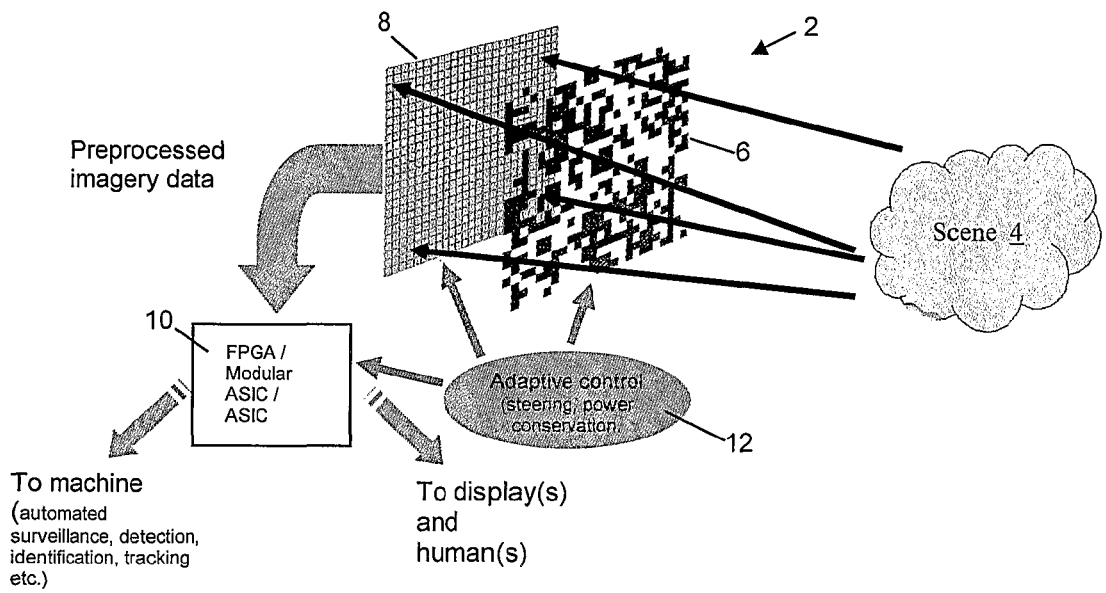
FIG. 1 shows schematically a coded imaging system of the present invention.

Coded aperture imaging (CAI) is based on the same principles as a pinhole camera. In a pinhole camera, images free from chromatic aberration are formed at all distances away from the pinhole, allowing the prospect of more compact imaging systems, with a much larger depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of conventional CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays", Applied Optics, Vol. 17, No. 3, pages 337-347, 1 Feb. 1978) are used where a deconvolution or decorrelation of the detector intensity pattern can yield a good approximation to the point distribution in the scene.

Previous CAI systems have generally been employed in applications where diffraction effects are minimal. For instance coded aperture imaging has often been used in astronomical imaging. However, for some applications of coded aperture imaging techniques, it is necessary to improve the angular resolution significantly. This can be especially true when operating in the visible, infrared or ultraviolet wavebands say, or in other wavebands requiring high resolution imagery. Assuming that the detector pixels are smaller than the feature size of the coded aperture array, p, the angular resolution is determined by $\tan^{-1}(p/s)$ where s is the optical distance between the mask and the detector array. Therefore increasing the resolution of the imager requires either decreasing the size of the apertures or increasing the mask to detector distance or both. With relatively small apertures and/or large mask to detector distances, diffractive effects start to become significant. The blurring effects of diffraction mean that the pattern projected onto the detector array is effectively smeared (reducing pattern contrast), and the coding effects of the mask are thereby reduced, thus reducing image quality. As diffraction effects increase eventually almost all the coded aperture information is lost. Rather than trying to minimise diffraction the present disclosure exploits the effects of diffraction whilst still employing the basic principles of coded aperture imaging. Thus the pattern formed on the detector array is still a coded information pattern and needs to be decoded. The present disclosure therefore offers all of the advantages of a coded aperture imaging system but mitigates or eliminates the adverse effects of diffraction, which is especially useful for high resolution imagers.

FIG. 1 shows schematically an example of coded imaging system of the present invention, generally indicated 2. Rays of light from points in the scene 4 fall onto a reconfigurable mask means 6 displaying a particular coded diffractive array. Using a reconfigurable mask offers versatility and can be advantageous for imaging in different wavebands. However a fixed mask could be used for a fixed scene imager.

As shown in FIG. 1 this mask is a binary amplitude mask operating in transmission, i.e. each separate area of the array, each pixel, is either completely transmissive or completely opaque. However other types of mask could be used. For instance amplitude or phase modulating masks could be used. The masks could be binary in nature or could have a greater number of fixed levels of modulation or could be substantially analogue.

The coded array is designed to act as a diffraction screen with a well conditioned diffraction pattern. In other words the diffraction grating is designed such that a single point source in the field of view at the wavelength of operation of the apparatus will produce a coded diffraction pattern on the detector array that has a sharp autocorrelation function with minimal sidelobes. Any such point in the field of view will therefore produce a well defined coded intensity pattern on the detector array and therefore a series of overlapping coded images are produced on the detector array 8 in a similar manner to a conventional coded aperture imager.

At each pixel on the detector array, the intensities from the overlapping, coded images are summed. The output from the detector array 8 is passed to a processor 10 where image of the scene can be subsequently decoded from the detector signals using a variety of digital signal processing techniques. The process of decoding may be exactly the same as for a conventional coded aperture array imager except that instead of using the mask pattern in the decoding step it is the diffraction pattern projected by the mask which is used in decoding.

The coded mask means is controlled by a controller 12 which controls the reconfigurable mask means to display different coded aperture masks. It will be apparent that the field of view is determined by the size and location of the coded array displayed on the reconfigurable mask means. Varying the position of a small array on the mask means changes the field of view. Thus the field of view of the imaging system can be easily steered by simply reconfiguring the mask means to alter the position of the coded aperture array. The resolution of the image can likewise be controlled.

The present invention therefore applies the principles of coded aperture imaging with the attendant advantages thereof, i.e. lightweight imaging, elimination of conventional depth of field, reconfigurability without requiring moving parts, but overcomes problems with diffraction.

If the intensity pattern on the detector array is D(x,y), and the scene intensity distribution after passage through the atmosphere is S(x,y,λ), where λ is the wavelength, then for a conventional coded aperture imager with diffraction:

$$D(x,y) \approx \int S(x,y,\lambda) \otimes |\Omega[A(x,y) \otimes P_0(x,y)]|^2 d\lambda + N(x,y)$$

where $\otimes$ represents a convolution, $\Omega$ is a diffraction operator, $P_0(x,y)$ is the transmission of an individual micro aperture in the mask, and A(x,y) is the mask function, describing the locations of the centre of the micro apertures in the mask. N(x,y) is a noise term. The integration is performed across the waveband being imaged. The approximation is due paraxiality assumption in the equation. Paraxiality becomes more of an approximation in some configurations, meaning that the convolution is an approximation. More precise (non convolution based) descriptions can be used if greater accuracy is required.

The non diffracting equivalent is:

$$D(x,y) = \int S(x,y,\lambda) \otimes M(x,y) d\lambda + N(x,y)$$

Where M is the mask pattern (as in a CAI system with no significant diffraction), or equivalently, its non diffracting projection on the detector.

It will be clear therefore that design of the diffractive pattern of the present invention to a give a well conditioned pattern at the detector array allows for image reconstruction in the same manner as for non diffracted CAI.

The design of the diffractive mask may use some of the same principles involved in creating a computer generated hologram (CGH). Computer generated holograms are, as the name suggests holograms represented on a spatial light modulator (SLM) which are calculated to provide a desired wavefront or image in space or at or near some arbitrary plane. CGHs offer the potential for, amongst other things, displays of apparently three dimensional objects. The hologram is formed as a diffraction pattern on the SLM which needs to be determined to give the correct diffraction. There are various approaches to CGH and various techniques have been developed. See for instance "Iterative approaches to computer-generated holography", Jennison, Brian K.; Allebach, Jan P.; Sweeney, Donald W., Optical Engineering (ISSN 0091-3286), vol. 28, June 1989, p. 629-637. Some of the same principles may be applied to design of the coded diffractive mask of the present invention. These techniques can be used either to design a mask to give a specific diffraction pattern (e.g. a pseudorandom binary pattern or a URA pattern) or they can be used to design a pattern based on a cost function which produces a diffracted pattern having the required properties e.g. an autocorrelation function which is sharp with low sidelobes.

The pattern for the coded diffractive mask can, of course, be precalculated and stored in a memory. The memory may store a range of different masks having different properties, for instance field of view, resolution, waveband of operation etc. The reconfigurable mask means may have a controller which chooses an appropriate mask pattern from the memory to suit a particular situation or in response to a control signal and reconfigures the reconfigurable mask means to provide the appropriate mask.

It should be noted that whilst the present invention can use an aperture array which is deigned to have a well conditioned diffraction pattern the masks of the present invention are not limited to such aperture arrays. Any amplitude modulating pattern could be used which displays a suitable diffractive mask. The amplitude modulating grating could be binary in nature, i.e. each pixel is either fully transmissive or non-transmissive (or reflective or non-reflective for a reflective based system) or could be analogue (greyscale). Depending on the wavelength of operation there are a range of suitable mask technologies. Liquid crystal displays can operate as binary or analogue amplitude modulators. Micro-mirror devices or MOEMS (micro optic electrical mechanical system) modulator arrays could also be used. Other modulator technologies may also be used, depending upon the application and the waveband.

Alternatively a phase grating could be used, i.e. each pixel modulates the phase of the radiation transmitted therethrough or reflected therefrom. It is well known that phase modulators can be used as diffraction gratings. Again liquid crystal devices or MOEMS modulators could be used to provide a suitable reconfigurable phase grating. The phase modulators could be binary phase modulators or analogue phase modulators, operating in reflection or transmission. Other phase modulator technologies may also be used, depending upon the application and the waveband.

Using a phase grating as the diffractive mask avoids the significant loss of intensity involved with amplitude modulating masks which necessarily block some radiation from reaching the detector. Therefore they can offer increased photon efficiency of the imager.

Where a reconfigurable phase modulator is used to provide the diffractive mask it may be necessary to also have a reconfigurable amplitude modulating mask to act as a shutter so as to select the field of view of the imager. Thus the amplitude modulating mask may allow radiation to pass to the detector only from a part of the scene, radiation from this part of the scene also being modulated by the phase modulating diffractive mask.

The reconfigurable mask means, in addition to varying the field of view and/or resolution of the imager by changing the position and characteristic of the diffractive mask may also display a series of different coded diffractive masks, each being designed to provide a well conditioned diffraction pattern at a different wavelength. It will be apparent that as diffraction is wavelength dependent any particular mask will provide a well defined diffraction pattern within a certain wavelength range, although careful design of the mask can maximise this range. The imager may therefore also employ a tuneable filter, either an optical filter or an electronic filter, or a series of filters which can be introduced into the optical path and may take a series of snapshots (or capture frames) of the scene, each at a different narrow waveband. These snapshots of the scene can be processed to produce an image for each waveband. These separate waveband images may, if desired, be combined into a single scene image. The present invention is therefore conveniently suited for use as a hyperspectral or multispectral imager.

FIG. 2 shows an example of a coded diffractive mask and also the simulated pattern that would be formed on the detector array when the diffractive mask was illuminated from a single point source in the scene. The coded diffractive mask is an analogue phase diffractive mask. Each pixel of this mask array applies a phase modulation to incident radiation. The degree of phase modulation is represented by the greyscale shade varying from white pixels representing a phase modulation of 0 radians and black pixels a modulation of $2\pi$. The mask could be displayed on any suitable pixellated phase modulator such as a MOEMS modulator array.

In this specific example, the diffractive coded mask is designed to generate a random binary intensity pattern (or another type of pattern used in CAI e.g. a URA) at the detector array, i.e. a point source illuminating the coded diffractive mask would illuminate each part of the detector array with an intensity which is either (ideally) 1 or 0 and that the distribution of 1s and 0s in the coded pattern formed on the detector array meets the criteria of being a random pattern. In the example shown, projection on to constrained sets incorporating a Rayleigh Somerfeld diffraction might be used, see the Jennison et al. paper. FIG. 2b shows part of the pattern formed by simulating a point source illumination and the correct spacing of the mask and detector array. It can be seen that the pattern is a well defined pattern with sharp edges. FIG. 2c shows the intensity variation across a row of the simulated intensity pattern. It can be seen that the intensity varies only very slightly from the ideal {0, 1} values. The pattern from a scene would therefore be a series of overlapping well defined and well conditioned coded patterns which could be recovered using standard coded aperture imaging type processing techniques to yield high quality high resolution images.

It will be appreciated that each pixel in the coded diffractive mask shown in FIG. 2a passes light to the detector array and thus the optical efficiency of such a coded aperture mask is high.

Figure 4:
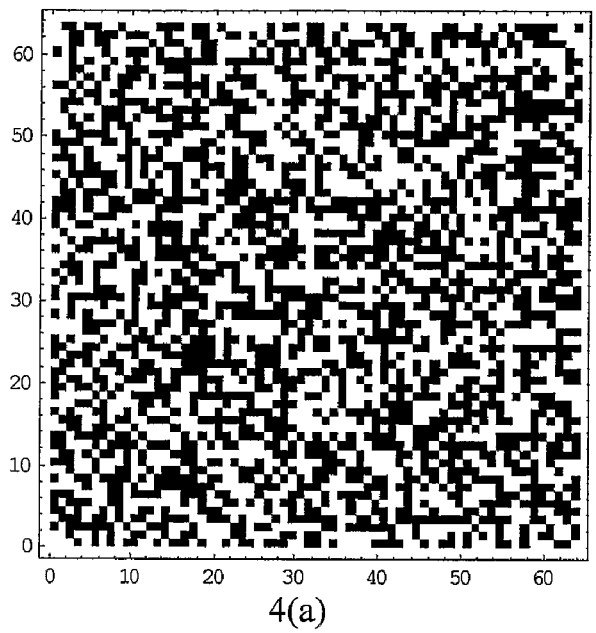
FIG. 4 shows another example of a mask pattern and the diffraction pattern formed on the detector array.
Figure 4:
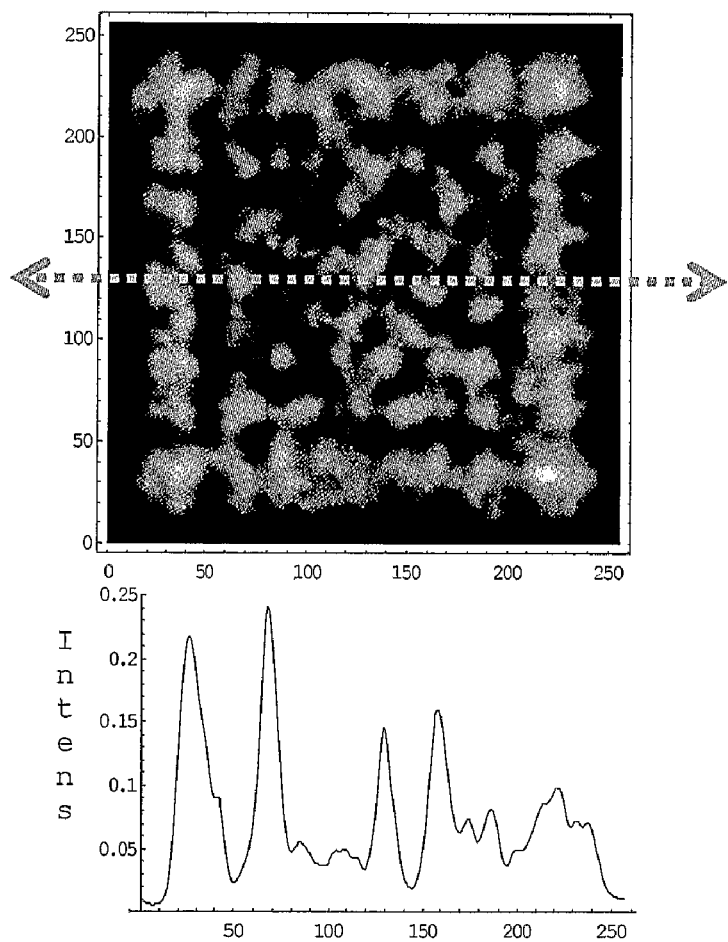

FIG. 4 shows another mask pattern and diffracted intensity example. FIG. 4a shows the actual mask pattern and FIG. 4b shows the diffracted pattern formed on the detector array, integrated across a band of wavelengths (3.5 μm-4.5 μm) together with the line scan showing the intensity pattern contrast across the indicated line diffracted pattern for this example.

Figure 3:
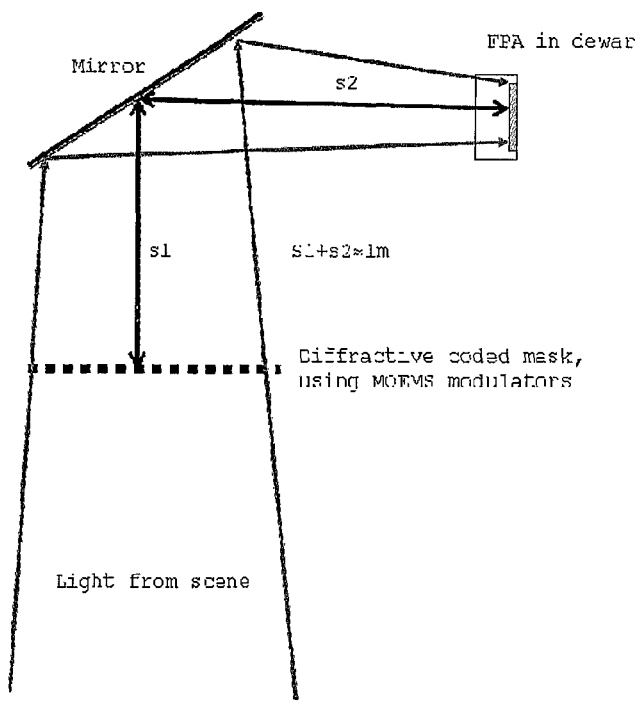
FIG. 3 illustrates a folded optical arrangement.

This invention can also exploit the use of additional optical elements in the optical path. In the simplest form, a planar mirror could be inserted between the diffracting mask and the detector array to fold the optical path between the mask and detector array as shown in FIG. 3. This allows a more compact system embodiment. Additionally or alternatively, optical elements with power (lenses, curved mirrors) could be used in conjunction with the mask and detector. These can either be between the two, or immediately prior to the diffracting mask. These allow further control of the diffraction patterns projected onto the masks. For example, an appropriately curved mirror and/or lens will permit the scaling of the diffracted pattern to be adjusted. In another example, the lens or mirror performs an optical Fourier transform of the mask pattern, with advantages in simpler mask pattern calculation.

This invention can also exploit the use of multiple diffractive masks, be they planar, curved or faceted.

The invention claimed is:

1. A coded aperture imager for forming an image from radiation from a field of view, the radiation being within a waveband of operation of the imager, and the imager comprising:
   a coded diffractive mask for receiving the radiation and for forming a coded diffraction pattern thereof upon a detector array to provide output data, the mask having a property that for a single point in the field of view and at the imager's waveband of operation the said coded diffraction pattern associated therewith is well conditioned with a sharp autocorrelation function having small sidelobes; and
   a processor configured to reconstruct an image of the field of view on the basis of an equation representing the detector array output data,
   wherein the equation contains a diffraction expression.

2. A coded aperture imager according to claim 1 wherein the coded diffractive mask is one of a binary amplitude mask, an analogue amplitude mask, a binary phase modulating mask and an analogue phase modulating mask.

3. A coded aperture imager according to claim 1 wherein the coded diffractive mask is provided by a reconfigurable coded diffractive mask means.

4. A coded aperture imager according to claim 1 wherein at least one optical element is located in an optical path between the coded diffractive mask and the detector array.

5. A coded aperture imager according to claim 1 including multiple coded diffractive masks for simultaneous use.

6. A coded aperture imager according to claim 1 including at least one filtering means with a passband which is changeable at least one of periodically, aperiodically and in response to a control signal.

7. A coded aperture imager according to claim 6 including different coded diffractive masks for different passbands of the filtering means.

8. A method of forming an image from radiation from a field of view by coded aperture imaging in a waveband of operation, wherein the method incorporates:
   arranging a coded diffractive mask to receive the radiation and to form a coded diffraction pattern thereof upon a detector array to provide output data, the mask having a property that for a single point in the scene and at the waveband of operation the said coded diffraction pattern associated therewith is well conditioned with a sharp autocorrelation function having small sidelobes;
   representing the detector array output data in terms of an equation which contains a diffraction expression; and
   reconstructing an image of the field of view on the basis of the equation.

9. A method according to claim 8 including the step of periodically reconfiguring the coded diffractive mask so as to provide at least one of a different field of view and a different resolution.

10. A method according to claim 8 further comprising the step of reconfiguring the coded diffractive mask and changing the waveband of operation.

* * * * *